United States Patent
Tobishima et al.

(10) Patent No.: US 7,127,726 B2
(45) Date of Patent: Oct. 24, 2006

(54) ELECTRONIC INSTRUMENT

(75) Inventors: Yasuyuki Tobishima, Kawagoe (JP); Yasuharu Nakamura, Kawagoe (JP); Akira Shimizu, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 119 days.

(21) Appl. No.: 10/394,140

(22) Filed: Mar. 24, 2003

(65) Prior Publication Data

US 2003/0193871 A1   Oct. 16, 2003

(30) Foreign Application Priority Data

Apr. 11, 2002   (JP) .............................. 2002-109266

(51) Int. Cl.
*G11B 17/03*   (2006.01)

(52) U.S. Cl. .................................... 720/600
(58) Field of Classification Search ................ 720/600; 369/75.11, 75.21, 77.11, 77.21, 178, 191, 369/192; 360/99.02, 99.06, 99.12
See application file for complete search history.

(56) References Cited

U.S. PATENT DOCUMENTS

| | | | | |
|---|---|---|---|---|
| 5,010,437 A | * | 4/1991 | Utsugi et al. | 360/137 |
| 5,177,730 A | * | 1/1993 | Utsugi | 369/75.1 |
| 5,848,042 A | * | 12/1998 | Takahashi et al. | 369/75.1 |
| 5,852,594 A | * | 12/1998 | Kaise et al. | 369/75.1 |
| 5,953,302 A | * | 9/1999 | Kobayashi | 369/75.1 |
| 6,398,168 B1 | * | 6/2002 | O Tae | 248/27.3 |
| 6,501,719 B1 | * | 12/2002 | Hada et al. | 369/75.1 |

FOREIGN PATENT DOCUMENTS

| EP | 0 991 067 A2 | 4/2000 |
|---|---|---|
| EP | 1 195 284 A2 | 4/2002 |

* cited by examiner

*Primary Examiner*—Allen Cao
(74) *Attorney, Agent, or Firm*—Sughrue Mion, PLLC

(57) ABSTRACT

An electronics instrument 1 includes an instrument body, an operation display unit and a driving mechanism. The driving mechanism moves the operation display unit over the span between a first position where the insertion inlet of the instrument body is covered and a second position where the insertion inlet is opened. The driving mechanism is provided with a helical torsion coil spring 30. At the first position, the helical torsion coil spring 30 urges the operation display unit toward the second position. At the second position, the helical torsion coil spring 30 urges the operation display unit toward the first position. This configuration suppresses the sound generated when the operation display unit of a cover is located at a first position where the one surface of the instrument body is covered and a second position where at least a part of the one surface is opened.

7 Claims, 9 Drawing Sheets

ELECTRONIC INSTRUMENT

BACKGROUND OF THE INVENTION

1. Field of the Invention

This invention relates to an electronic instrument such as an audio instrument which is mounted in e.g. a motor car as a moving body.

2. Description of the Related Art

A CD player as an electronic instrument is attached on e.g. an instrument panel (hereinafter referred to as "inpane") The CD player serves to read out the information recorded on a recording medium such as a compact disk (CD).

The CD player includes a flat box-like instrument body attached to the inpane, and an operation panel which is a cover having a display as a LC display and various kinds of operation buttons, etc. In a surface opposite to a crew of the instrument body, an insertion inlet is made which is used to insert the CD into the instrument body and discharge the CD from the instrument body.

In the CD player described above, in order to reduce the space required when the CD player is mounted in the inpane, the operation panel is made movable to the instrument body between the first position where the insertion inlet is covered and the second position where the insertion inlet is opened.

The CD player described above locates the operation panel at the second position where the insertion inlet is opened in order to load and unload the CD in and out of the instrument body through the insertion inlet. After the CD has been inserted into the instrument body, the operation panel is located at the first position where the insertion inlet is covered and an operation button is operated to read out (reproduce) the information recorded on the CD so that the information is outputted as sound. The information indicative of the reproduced state is displayed on a liquid crystal (LC) display.

The operation panel of the conventional CD player described above is slidably movable between the first position and the second position. The operation panel is provided with an urging means such as a cushion in order to prevent an unusual sound from being generated owing to vibration of the operation panel while a motor vehicle runs. Known means for urging the CD player employed conventionally are to urge the operation panel from the first position toward the second position, or from the second position toward the first position. In this way, the CD player employed conventionally urge either one of from the first position to the second position and from the second position to the first position.

In the CD player in which the urging means urging the operation panel from the first position to the second position, the urging means suppresses sound generated by a driving mechanism when the operation panel has been moved from the first position to the second position. When the operation panel has been moved from the first position to the second position, the urging means does not still urge the operation panel so that that the operation panel generates impactive sound.

On the other hand, in the CD player in which the urging means is urging the operation panel from the second position to the first position, the urging means suppresses sound generated by a driving mechanism when the operation panel is moved from the second position to the first position. When the operation panel has been moved from the second position to the first position, the urging means does not urge the operation panel so that that the operation panel generates impactive sound.

In this way, the CD player employed conventionally generates the impactive sound when the operation panel has located at either one of the first position and the second position. This may give unpleasant feelings to the crew(s) of the motor vehicle.

SUMMARY OF THE INVENTION

This invention has been accomplished in order to overcome the above inconvenience, and intends to provide an electronic instrument which can suppress sound generated when a cover is located at both positions of a first position where one of the surfaces of an instrument body is covered with the cover and a second position where at least a part of the one surface is opened.

In order to attain the above object, in accordance with this invention, there is provided an electronics instrument comprising: an instrument body and a cover which is attached on one of surfaces of the instrument body so that the cover is movable over a first position and a second position where the one surface of the instrument body is covered and a second position where at least a part of the one surface is opened, and an urging device for urging the cover switchably between a first state what is that the cover is urged toward the second position and a second state what is that the cover is urged toward the first position, becoming the first state when the cover is located at the first position and becoming the second state when the cover is located at the second position.

In accordance with the configuration of the electronic instruments described above, when the cover is located at the first position, the urging device urges the cover toward the second position. When the cover is located at the second position, the urging device urges the cover toward the first position. Therefore, when the cover is moved from the second position to the first position, as the cover approaches the first position, the cover is urged toward the second position by the urging means. On the other hand, when the cover is moved from the first position to the second position, as the cover approaches the second position, the cover is urged toward the first position by the urging device.

Preferably, the electronics further includes an arm member for rotatably supporting the cover to the instrument body; and a rotary member which is rotated in both one direction and the other direction opposite thereto by driving force from a driving source, and rotated together with the arm member, wherein the urging device includes a helical spring with one end secured to the arm member and a central portion attached to a rotary center of the rotary member, and an arc hole through which the rotary member passes and into which the other end of the helical spring is to come, the center of the arc hole being positioned at the rotary center of the rotary member, and wherein when the cover is located at the first position, the other end of the helical spring is brought into contact with a first inner wall of the hole apart from the cover in the circumferential direction of the rotary member, and when the cover is located at the second position, the other end of the helical spring is brought into contact with a second inner wall of the hole near to the cover in the circumferential direction of the rotary member.

In accordance with the configuration of the electronic instrument described above, when the cover is located at the first position, the other end of the helical spring is brought into contact with the first inner wall on the side apart from the cover of the hole which passes through the rotary member. Therefore, when the cover is located at the first position, the urging device surely urges the cover toward the second position. When the cover is located at the second position, the other end of the helical spring is brought into contact with the second inner wall on the side near to the cover of the hole which passes through the rotary member. Therefore, when the cover is located at the second position, the urging device surely urges the cover toward the first position.

The above and other objects and features of this invention will be more apparent from the following description taken in conjunction with the accompanying drawings.

DESCRIPTION OF THE PREFERRED EMBODIMENTS

Now referring to FIGS. 1 to 12, an explanation will be given of an electronic instrument according to an embodiment of this invention. In the respective figures, the direction in which the compact disk (CD) as a storage medium is inserted is referred to as "Y" direction; the width direction of the instrument body 2 which is perpendicular to the Y direction is referred to as "X" direction; and the direction of the thickness direction which is perpendicular to both X and Y direction is referred to as "Z" direction.

Figure 1:
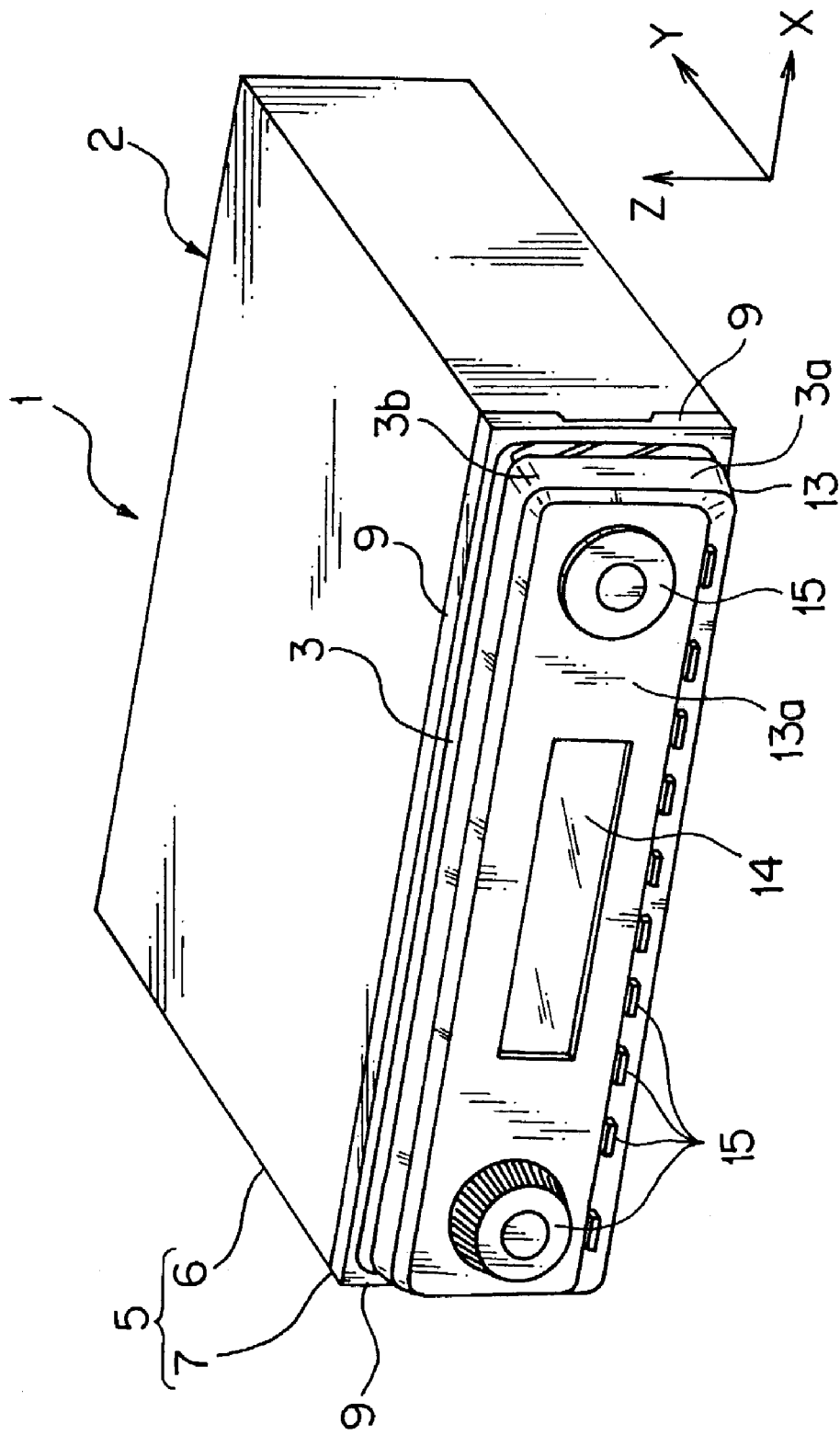
FIG. 1 is a perspective view of an electronic instrument according to an embodiment of this invention.

An electronic instrument 1 shown in FIG. 1 is mounted in an instrument panel (hereinafter referred to as "inpane") of a motor vehicle which is a moving body. The electronic instrument 1 includes a CD player which accommodates the CD and reads out (reproduce) the information recorded on the CD to be outputted as sound and an AM/FM tuner which receives an AM/FM broadcast wave and outputs the received information as sound.

Figure 2:
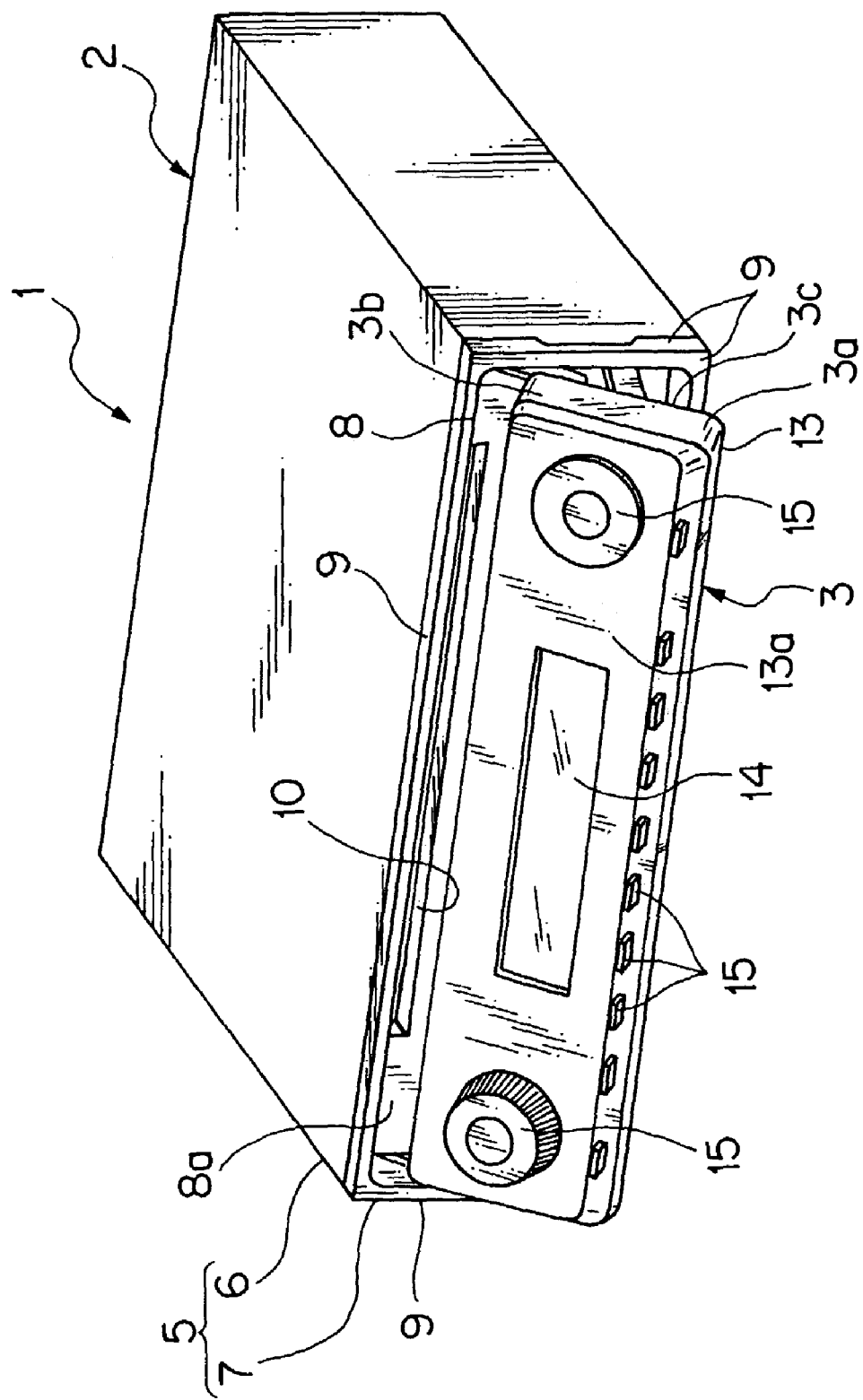
FIG. 2 is a perspective view of an electronic instrument as shown in FIG. 1 when the operation display unit has been shifted to an intermediate position.
Figure 3:
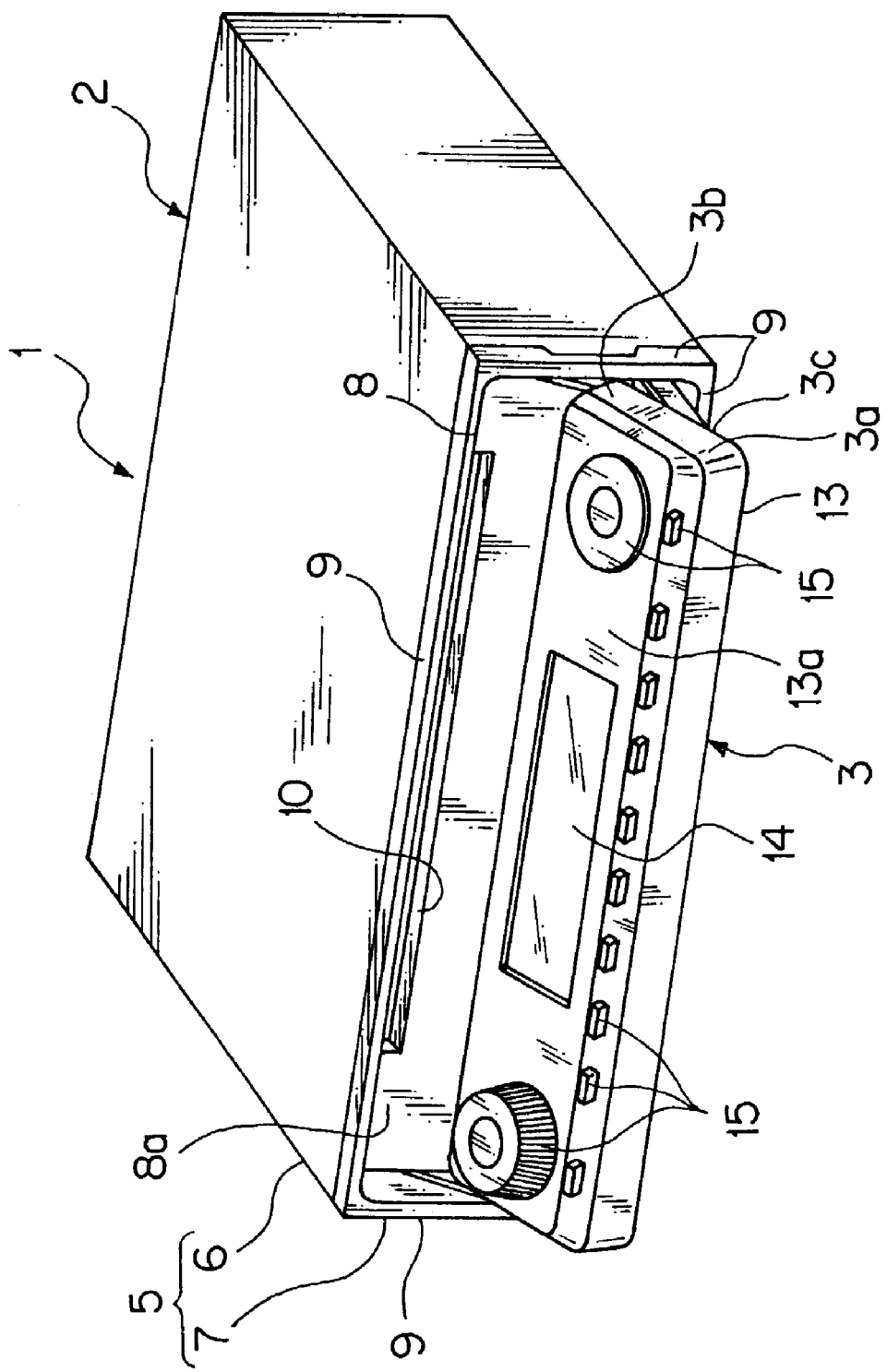
FIG. 3 is a perspective view of an electronic instrument as shown in FIG. 1 when the operation display unit has been shifted to a second position.
Figure 4:
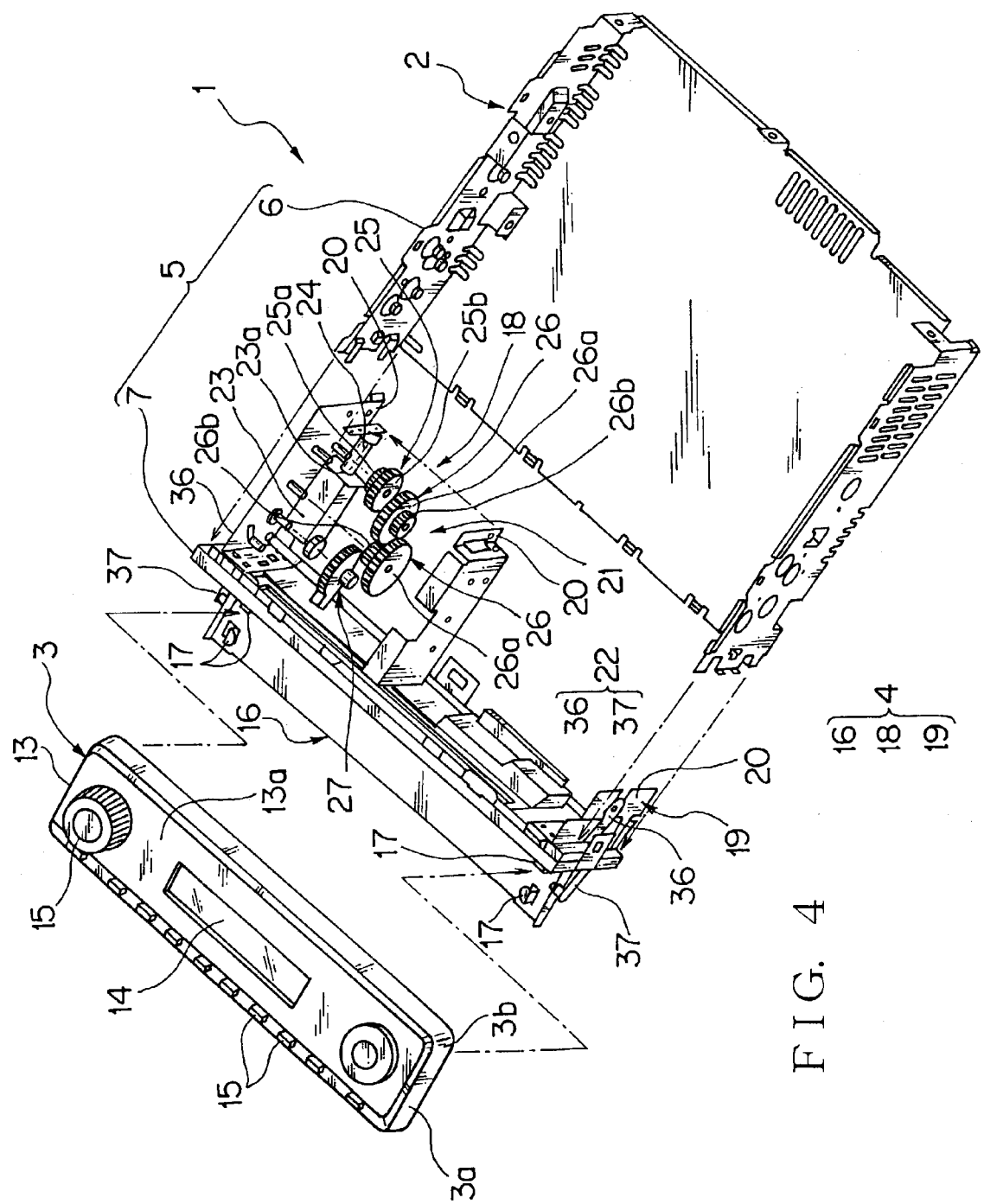
FIG. 4 is an exploded perspective view of the main part of the electronic instrument as shown in FIG. 1.

The electronic instrument 1, as seen from FIGS. 1 to 3, includes an instrument body 2, an operation display unit (operation flap (also referred to as "opefla")) 3 and a driving unit 4 (shown in FIG. 4 and others). The instrument body 2 includes a chassis 5 formed in a flat box shape, a CD player and an AM/FM tuner accommodated in the chassis 5, etc.

The chassis 5 is provided with a chassis body 6 and a front panel attached to this side of the chassis body 6 in FIGS. 1 to 3. The chassis body 6 is formed in a flat box shape with an opening on this side in FIGS. 1 to 3. The chassis body 6 can be formed by bending e.g. a metallic plate.

The front panel 7 is attached to the chassis body 6 so as to block the above opening. The front panel 7 is integrally provided with a flat wall 8 and upright walls 9 on the outer edges of the flat wall 8. When the front panel 7 is attached to the chassis body 6, the wall 8 closes the opening. The planar shape of the wall 8 is formed in a square shape.

The wall 8 has an inlet 10 (shown in FIG. 2 or 3) used to insert a CD into the inside of the instrument body 2 and discharge the CD from the instrument body 2 and a connector not shown. The inlet 10 passes through the wall 8 so that the CD can be sent toward the inside of the instrument body 2. The connector is used to transmit various kinds of signals from the operation display unit 3 located at the first position described below to the instrument body 2 or transmit the various kinds of signals and electric power from the instrument body 2 to the operation display unit 3.

The upright walls 9 are formed at all the edges of the surface 8a of the wall 8 located on this side in FIG. 1. The operation display unit 3 is accommodated in the space encircled by the plurality of upright walls 9 at the first position. The surface 8a of the wall 8 corresponds to a surface of the instrument body described in claims.

The CD player and AM/FM tuner accommodated in the chassis 5 operate when switches 15 attached to the operation display unit 3 are depressed by a user.

The operation display unit 3, as shown in FIG. 1, includes a flat box-shaped housing 13, a liquid crystal display (LCD) which serves as a display panel accommodated in the housing 13 and the various switches 15. The planar shape of the housing 13 is formed in a square shape. The length of the housing 13 in the X direction is approximately equal to the width of the chassis 5 of the instrument body 2. The length of the housing in the Z direction is approximately equal to the thickness of the instrument body 2.

The LCD 14 has a display surface which constitutes a display area on which various items of information are displayed for the user. The various switches 15 constitute an operation unit to be operated by the user. The display surface and the operation unit are located on the surface 13a of the housing 13 on this side in FIG. 1.

When one of the switches 15 attached to the operation display unit 3 is operated by the user 15, the broadcasting station the radio wave from which is received by an AM/FM tuner is tuned. The frequency of the broadcasting station being tuned is displayed on the LCD 14 of the operation display unit 3.

When another one of the switches 15 attached to the operation display unit 3 is operated by the user 15, a piece of music to be reproduced by the CD player is selected. The information such as a track number of the piece of music is displayed on the LCD 14 of the operation display unit 3.

The operation display unit 3 is removable from the holder 16 (see FIGS. 4 and 5) of the driving mechanism 4.

At both side ends of a rear face 3c of the surface 13a of the operation display unit 3, concave grooves (not shown) are formed. The holder 16 is provided with securing pieces 17 (FIG. 4) which are to be locked in the concave grooves. By securing the securing pieces 17 into the concave grooves, the operation display unit 3 is attached to the holder 16. By releasing the securing pieces 17 from the concave grooves, the operation display unit 3 is taken from the holder 16.

The operation display unit 3 attached to the holder 16 is moved over the span including the first position shown in FIG. 1, intermediate position shown in FIG. 2 and second position in FIG. 3 by the driving mechanism 4. In this embodiment, the operation display unit 3 is moved from the first position to the second position via the intermediate position by the driving mechanism 4. Further, the operation display unit 3 is moved from the second position to the first position via the intermediate position.

At the first position, the operation display unit 3 is accommodated in the space encircled by the upright walls 9 and the surface 8a of the front panel 7. The surface 13a of the operation display unit 3 is in parallel to the surface 8a of the front panel 7. The surface 8a of the front panel 7, i.e. inlet 10 is covered with the operation display unit 3.

At the second position, the lower end 3a and the upper end 3b of the operation display unit 3 have been moved forward and down, respectively from the first position so that the inlet 10 is exposed. The lower end 3a moves toward the user in the Y direction. Therefore, at the second position, the surface 13a of the operation display unit 3 is oriented upward. Further, the operation display unit 3 opens at least a part of the surface 8a, i.e. inlet 10. The above intermediate position is located between the first position and the second position.

Thus, the operation display unit 3 is slidably attached to the instrument body 2 over the span between the first position where the surface 8a i.e. inlet 10 is covered as shown in FIG. 1 and the second position where at least a part of the surface 8a i.e. inlet 10 is opened as shown in FIG. 3.

Figures 5, 10:
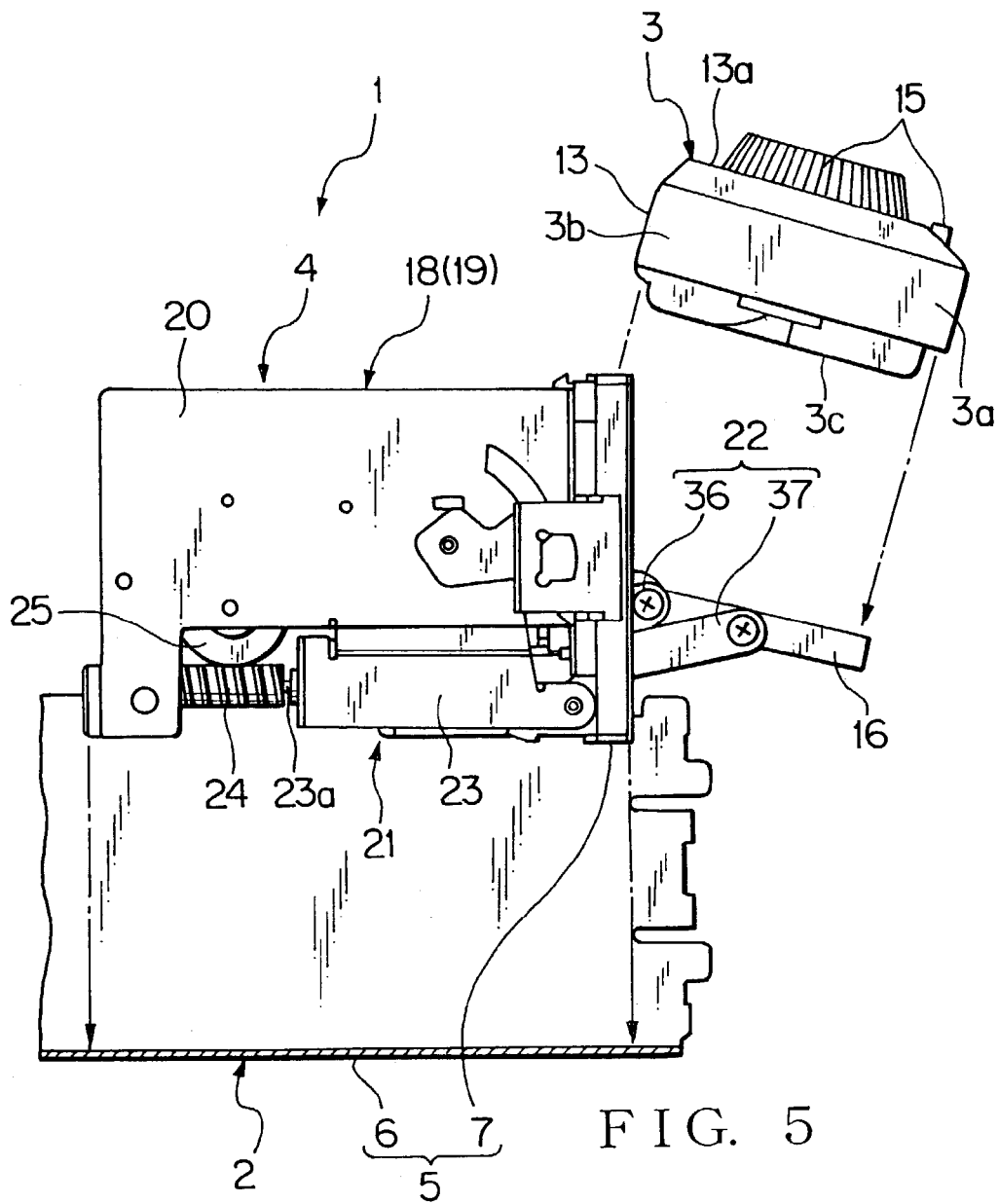
FIG. 5 is an exploded side sectional view of the main part of the electronic instrument as shown in FIG. 1.
FIG. 10 is a view for explaining a hole which passes through a frame of the electronic instrument as shown in FIG. 7 and the other end of a helical torsion coil spring.
Figure 6:
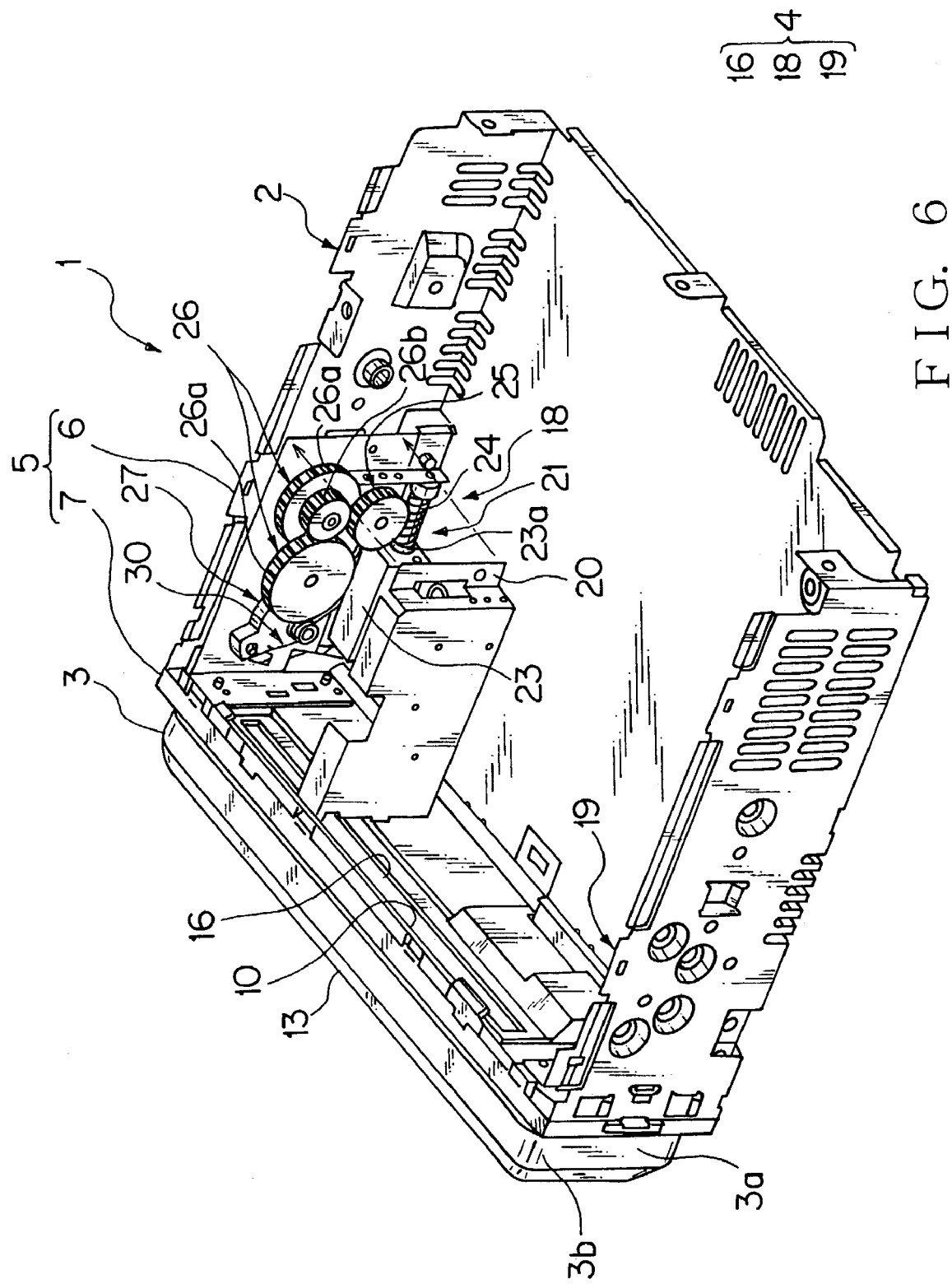
FIG. 6 is a perspective view of an electronic instrument into which its main components as shown in FIG. 4 are assembled.

As seen from FIGS. 4 to 6, the driving mechanism 4 includes a holder 16 serving as an intermediate cover, a first driving unit 18 and a second driving unit 19. The holder 16 is a metallic plate which is square in the planar shape. The holder 16 is arranged in a state where its longitudinal direction is in the width direction (X direction) of the instrument body 2. The holder 16 is slightly smaller that the front panel 7.

The operation display unit 3 is removable from the holder 16. The holder 16 is provided with four securing pieces 17 as shown in FIG. 4. These securing pieces 17 are attached to the holder 16. Two securing pieces 17 are provided at each of both ends in the longitudinal direction (X direction) of the holder 16. Namely, the four securing pieces 17 are given as two pairs of securing pieces 17. The respective securing pieces of each pair are attached to the holder 16 so as to be apart from each other in the direction (Z direction) of the instrument body 2. These four securing pieces 17 are urged by e.g. a spring (not shown) toward the center of the holder 16.

The holder 16 is attached to the operation display unit 3 by locking the locking pieces 17 in the concave grooves (not shown) of the operation display unit 3. For example, the locking pieces 17 are released from the concave grooves in such a way that the user moves the operation display unit 3 toward the lower part of the holder 16. Thus, the operation display unit 3 is taken out from the holder 16.

At the first position, the holder 16 is accommodated in the space encircled by the upright walls 9 and the surface 8a of the front panel 7. The holder 16 is in parallel to the surface of the surface 8a of the front panel 7. At the second position, as seen from FIG. 9, the lower end of the holder 16 has been projected from the front panel 7 from the first position and the upper end thereof is moved down from the first position. The surface of the holder 16 is oriented upward. At the intermediate position, as seen from FIG. 8, the holder 16 is located between the first position shown in FIG. 7 and the second position shown in FIG. 9.

The first driving unit 18 and the second driving unit 19 are arranged within the chassis body 6. The first driving unit 18 and the second driving unit 19 are arranged apart from each other in the width direction of the instrument body 2. The first driving unit 18 and the second driving unit 19 are arranged on both ends in the width direction (X direction) of the instrument body 2 to support the both ends of the holder 16.

Figure 7:
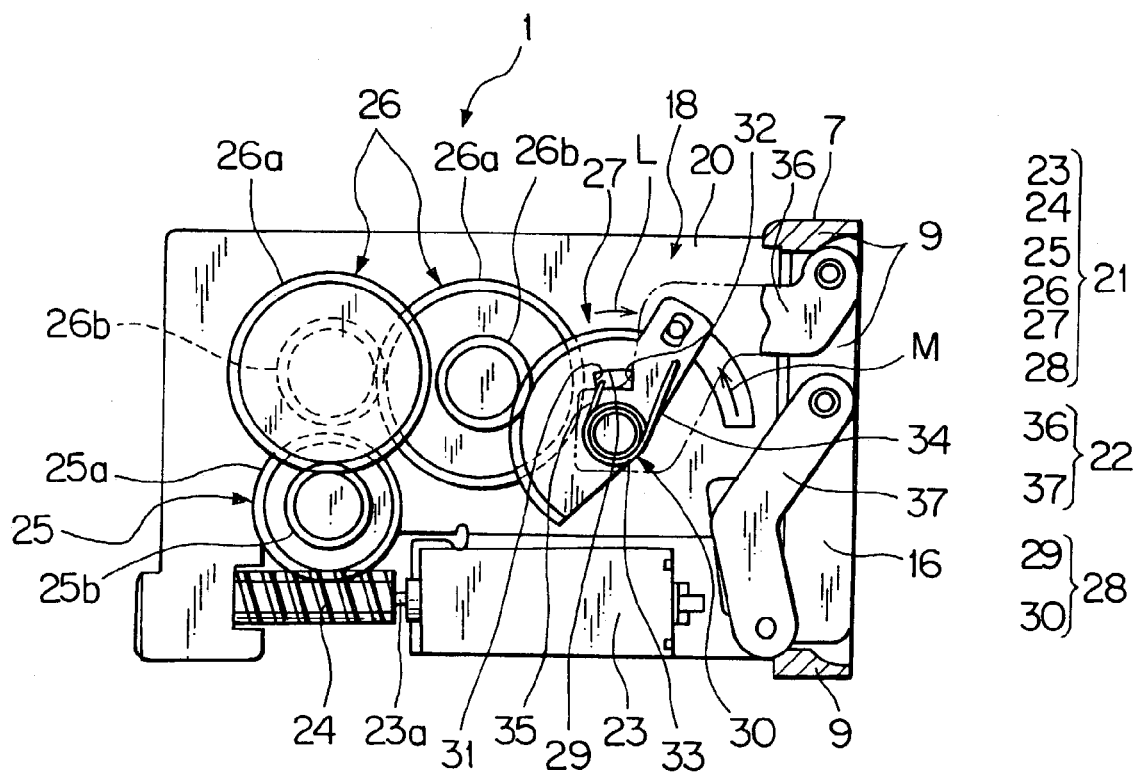
FIG. 7 is a side view of the first driving unit and others of the electronic instrument as shown in FIG. 1.
Figure 9:
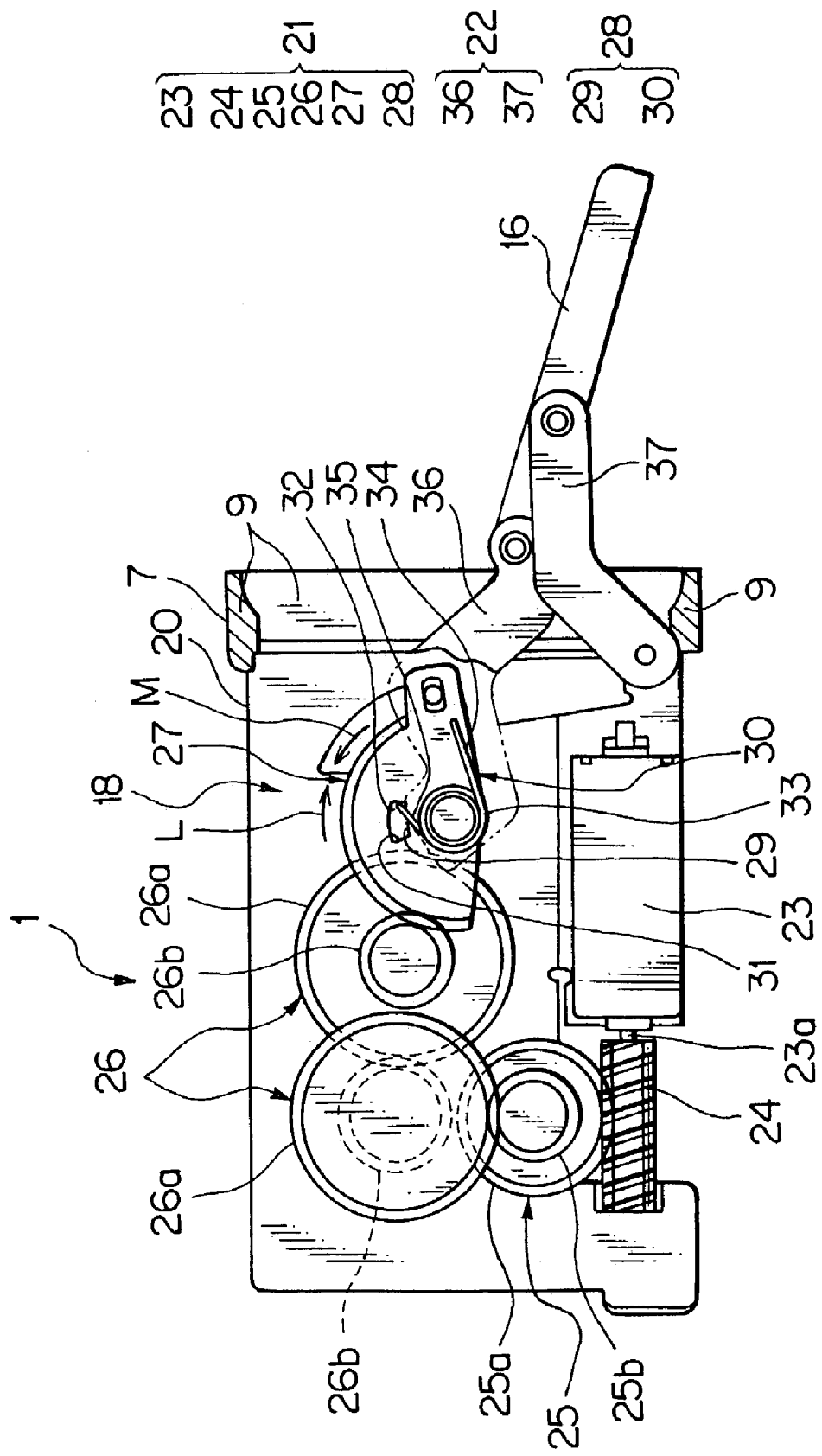
FIG. 9 is a side view of the first driving unit and others of the electronic instrument as shown in FIG. 3.

The first driving unit 18 is located on the deep side in FIG. 4, and as seen from FIGS. 4, 7 and 9, includes a pair of frames 20, a driving source portion 21 and a driving portion 22. The frames 20, which are formed of e.g. metallic plate, are accommodated in the chassis 5 of the instrument body 2. The frames 20 are fixed to both the chassis body 6 and the front panel 7 of the chassis 5. The frames 20 are upright from the bottom of the chassis body 6. The frames 20 are arranged apart from each other in the width direction (X direction) of the instrument body 2.

The driving source portion 21 includes a motor 23 serving as a driving source, a worm 24, a worm wheel 25, a plurality of transmission gears 26, a rotary gear 27 serving as a rotating member and an urging portion 28 serving as an urging means. The motor 23 is provided with an output axis 23a which is rotatable in both the normal and reverse directions. The motor 23 is attached to the frame 20.

The worm 24 is attached to the output axis 23a of the motor 23. The worm wheel 25 integrally includes a large diameter gear portion 25a and a small diameter gear portion 25b which are coaxially arranged. The worm wheel 25 is arranged between the pair of frames 20 and rotatably supported by the pair of frames 20. The large diameter gear portion 25a of the worm wheel 25 is in mesh with the worm 24.

In the illustrated example, two transmission gears 26 are provided. Each transmission gear 26 integrally includes a large diameter gear portion 26a and a small diameter gear portion 26b. The transmission gears 26 are arranged between the pair of frames 20 and supported by the pair of frames 20. The large diameter gear portion 26a of the one transmission gear 26 is in mesh with the small diameter gear portion 25b of the worm wheel 25. The small diameter gear portion 26b of the one transmission gear 26 is in mesh with the large diameter gear portion of the other transmission gear 26.

The rotary gear 27 is arranged between the pair of frames 20 and rotatably supported by the pair of frames 20. The rotary gear 27 is in mesh with the small diameter gear portion 26b of the other transmission gear 26. The respective centers of the worm wheel 25 and the gears 26 and 27 are in the axial direction (X direction) of the instrument body 2.

The urging portion 28 includes a hole 29 and a helical torsion coil spring 30 serving as a torsion spring (FIG. 7). As seen from FIGS. 7 and 10, the hole 29 is formed in an arc shape around the rotating center of the rotary gear 27. The hole 29, as seen from FIGS. 10 to 12, has a first inner wall 31 and a second inner wall 32 which are apart from each other in the circumferential direction of the rotary gear 27. The first inner wall 31 is located at the position of the hole 29 far from the holder 16 or operation display unit 3 in the circumferential direction. The second inner wall 32 is located at the position of the hole 29 near to the holder 16 or the operation display unit 3 in the circumferential direction.

The helical torsion coil spring 30 is made of a single metallic linear member, and integrally includes a ring-shaped central portion 33, one end 34 which is successive to the central portion 33 and bar-like and the other end 35 which is successive to the central portion 33. The helical torsion coil spring 30 is attached to the rotary gear 27 in a state where the one end 34 is located nearer than the other end 35 to the holder or operation display unit 3.

The central portion 33 of the helical torsion coil spring 30 is arranged coaxially with the rotating center of the rotary gear 27. The one end 34 of the helical torsion coil spring 30 is secured to a first arm 36 of the driving portion 22. The other end 35 of the helical torsion coil spring 30 is inserted into the hole 29. At the first position, the other end 35 is brought into contact At the second position, the other end 35 is brought into contact with the second inner wall 32 of the hole 29 so that the other end 35 is pushed from the second inner wall 32. At the intermediate position, the other end 35 is apart from both first and second inner wall 31 and 32 and so not in contact with these inner walls 31 and 32.

When the other end 35 is brought into contact with the first inner wall 31 and pushed therefrom, the helical torsion coil spring 30 urges the one end 34 or the first arm 36 so as to leave the other end 35. On the other hand, when the other end 35 is brought into contact with the second inner wall 32 and pushed therefrom, the helical torsion coil spring 30 urges the one end 34 or the first arm 36 so as to approach the other end 35.

The driving portion 22 includes a first arm 36 and a second arm 37 which serve as arm members. The first arm 36 is made of a metallic plate, and formed in a <-shape when viewed from the side. The one end of the first arm 36 is fixed to the rotating center of the rotary gear 27. Therefore, the first arm 36 rotates with the rotary gear 27 around the one end. Further, the one end of the first arm 36 is fixed to the one end 34 of the helical torsion coil spring 30. The other end of the first arm 36 is rotatably coupled with the upper end of the holder 16. Therefore, by the first arm 36, the holder 16 rotatably supports or operation display unit 3 to the instrument body 2.

The second arm 37 is made of a metallic plate, and formed in a <-shape when viewed from the side. The one end of the second arm 37 is rotatably coupled with the frame 20. The other end of the second arm 37 is rotatably coupled with the central portion of the holder 16.

As seen from FIG. 4, the second driving unit 19 includes a frame 20, first arm 36 and second arm 37, which are identical to those of the first driving unit 18 in their function. Incidentally, the one end of the first arm 36 is rotatably supported by the frame 20. In accordance with the configuration described above, the first and the second driving unit 18, 19 rotate the rotary gear 27 and first arm 36 in both direction of arrow L and arrow M in FIG. 8 by the rotary driving force of the motor 23. Thus, the holder 16 and hence the operation display unit 3 are moved over the span between the first position as shown in FIG. 7 and the second position shown in FIG. 9.

Figure 11:
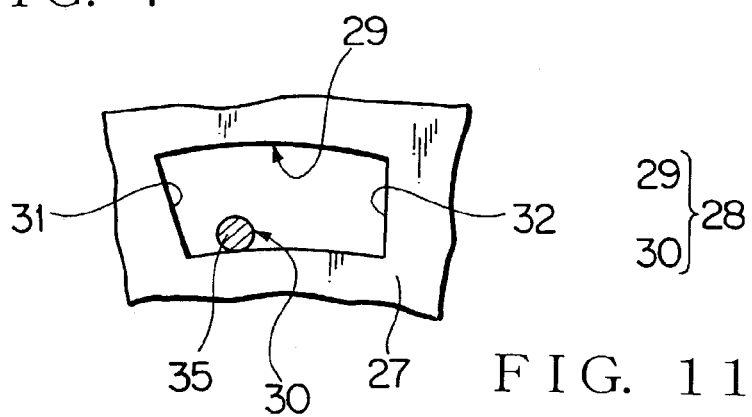
FIG. 11 is a view for explaining a hole which passes through a frame of the electronic instrument as shown in FIG. 8 and the other end of a helical torsion coil spring.
Figure 12:
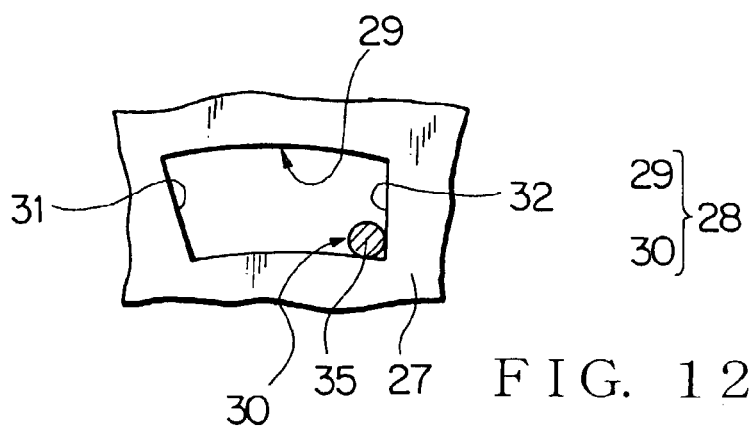
FIG. 12 is a view for explaining a hole which passes through a frame of the electronic instrument as shown in FIG. 9 and the other end of a helical torsion coil spring.

At the first position, the helical torsion coil spring 30 with the other end 35 being in contact with the first inner wall 31 as shown in FIG. 10 urges the holder 16 or operation display unit 3 toward the second position with the aid of the first arm 36. At the second position, the helical torsion coil spring 30 with the other end 35 being in contact with the first inner wall 31 as shown in FIG. 12 urges the holder 16 or operation display unit 3 toward the first position with the aid of the first arm 36. At the intermediate position, as shown in FIG. 11, the other end 35 of the helical torsion coil spring 30 is not in contact with both the first inner wall 31 and the second inner wall 32.

Incidentally, the state where the operation display unit 3 is being urged toward the second position is referred to as a first state, whereas the state where the operation display unit 3 is being urged toward the first position is referred to as a second state. Thus, the urging portion 28 can be switched between the first state and the second state when the other end 35 of the helical torsion coil spring 30 is brought into contact with the first inner wall 31 and the second inner wall 32. When the operation display unit 3 is located at the first position, the urging portion 28 falls into the first state. When the operation display unit 4 is located at the second position, the urging portion 28 falls into the second state.

An explanation will be given of the operation of the electronic equipment 1 provided with the driving mechanism 4 described above. At the first position, the holder 16 and the operation display unit 3 are accommodated in the space encircled by the surface 8a and upright walls 9. Further, as seen from FIGS. 7 and 10, the other end of the helical torsion coil spring 30 is in contact with the inner wall 31 of the hole 29 (first state). The helical torsion coil spring 30 is urging the holder 16 or the operation display unit 3 toward the second position.

Figure 8:
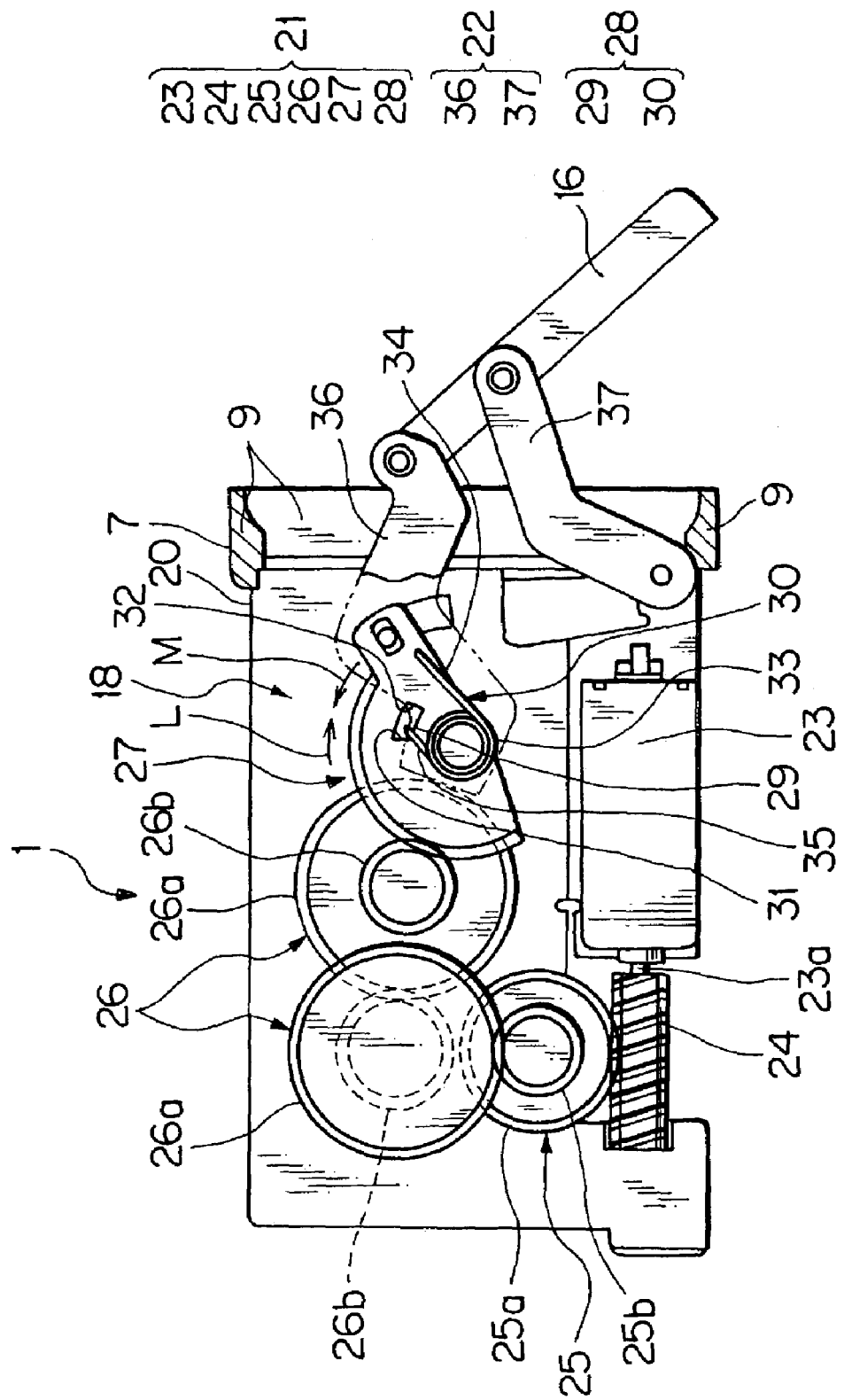
FIG. 8 is a side view of the first driving unit and others of the electronic instrument as shown in FIG. 2.

When the motor 23 rotates e.g. in the normal direction and the rotary gear 27 rotates in the direction of arrow L in FIGS. 7 and 8, the first arm 36 rotates around the one end in the direction of arrow L. Then, the second arm 37 rotates around the one end.

The other end 35 of the helical torsion coil spring 30 leaves the first inner wall 31 while the rotary gear 27 rotates. The holder 16 or operation display unit 3 shifts to the intermediate position as shown in FIG. 8. At the intermediate position, as seen from FIG. 11, the other end 35 of the helical torsion coil spring 30 is located between the first inner wall 31 and the second inner wall 32 and not in contact with both inner walls 31 and 32.

When the motor 23 further rotates in the normal direction, the rotary gear 27 and the first arm 36 rotate in the direction of arrow L so that the other end 35 of the helical torsion coil spring 30 gradually approaches the second inner wall 32. When the operation display unit 3 approaches the second position, as seen from FIG. 12, the other end 35 is brought into the inner wall 32. Then, the other end 35 is pushed from the second inner wall 32 so that the helical torsion coil spring 30 produces urging force in the direction in which the one end 34 approaches the other end 35.

As shown in FIG. 9, the helical torsion coil spring 30 generates urging force in the direction of arrow M opposite to that of arrow L described above, and falls into the second state. Then, the holder 16, i.e. operation display unit 3 is located at the second position as shown in FIG. 9. In addition, the helical torsion coil spring 30 and others urges the holder 16, i.e. operation display unit 3 toward the first position with the aid of the rotary gear 27 and others.

In the state where the holder 16, i.e. operation display unit 3 is located at the second position, when the motor 23 rotate in a reverse direction, the rotary gear 27 rotates in the direction of arrow M in FIG. 9. Then, the first arm 36 rotates around the one end in the direction of arrow M. Successively, the second arm 37 rotates around the one end.

The other end 35 of the helical torsion coil spring 30 leaves the second inner wall 32 while the rotary gear 27 rotates. In due time, the holder 16, i.e. operation display unit 3 is shifted to the intermediate position shown in FIG. 8.

When the motor 23 further rotates in the reverse direction, the rotary gear 27 and first arm 36 also further rotates in the direction of arrow M so that the other end 35 of the helical torsion coil spring 30 approaches the first inner wall 31. When the operation display unit 3 approaches the first position, as seen from FIG. 10, the other end 35 is brought into contact with the first inner wall 31. Then, the other end 35 is pushed from the first inner wall 31 so that the helical torsion coil spring 30 produces urging force in the direction in which the one end 34 leaves the other end 35.

As shown in FIG. 7, the helical torsion coil spring 30 generates urging force in the direction of arrow L opposite to that of arrow M described above, and falls into the first state. Then, the holder 16, i.e. operation display unit 3 is located at the first position as shown in FIG. 7. In addition, the helical torsion coil spring 30 and others urge the holder 16, i.e. operation display unit 3 toward the second position with the aid of the rotary gear 27 and others.

In accordance with this embodiment, when the operation display unit 3 is located at the first position, the other end 35 of the helical torsion coil spring 30 is brought into contact with the first inner wall 31 of the hole 29 on the side far from the operation display unit 3 and is pushed from the first inner wall 31. Therefore, when the operation display unit 3 is located at the first position, the helical torsion coil spring 30 and others surely urge the operation display unit 3 toward the second position.

Where the operation display unit 3 is moved from the second position to the first position, as the operation display unit 3 approaches the first position, the operation display unit 3 is surely urged toward the second position by the helical torsion coil spring 30. Therefore, when the operation display unit 3 is located at the first position as a result that the operation display unit 3 has been moved from the second position to the first position, impulsive sound which the driving units 18 and 19 may produce can be surely suppressed.

When the operation display unit 3 is located at the first position, the other end 35 of the helical torsion coil spring 30 is brought into contact with the second inner wall 32 of the hole 29 on the side of the operation display unit 3. Therefore, when the operation display unit 3 is located at the second position, the helical torsion coil spring 30 and others surely urge the operation display unit 3 toward the first position.

Where the operation display unit 3 is moved from the first position to the second position, as the operation display unit 3 approaches the second position, the operation display unit 3 is surely urged toward the first position by the helical torsion coil spring 30 and others. Therefore, when the operation display unit 3 is located at the second position as a result that the operation display unit 3 has been moved from the first position to the second position, impulsive sound which the driving units 18 and 19 may produce can be surely suppressed.

Thus, when the operation display unit 3 is located at both first and second positions, generation of unusual sound (impulsive sound) can be surely suppressed.

Using a single helical torsion coil spring, switching can be made between the first state where the urging portion 28 urges the operation display unit 3 toward the second position and the second state where the urging portion 28 urges the operation display unit 3 toward the first position. The increase in the number of the components can be suppressed in order to urge the operation display unit 3 toward the first position and the second position. This suppresses the unusual sound and implement the low cost of the electronic instrument.

As understood from the description hitherto made, in accordance with the invention, when the cover is moved from the second position to the first position, as the cover approaches the first position, the cover is urged toward the second position by the urging means. For this reason, the impactive sound generated when the cover is moved from the second position to the first position and located at the first position can be suppressed.

On the other hand, when the cover is moved from the first position to the second position, as the cover approaches the second position, the cover is urged toward the first position by the urging means. For this reason, the impactive sound generated when the cover is moved from the first position to the second position and located at the second position can be suppressed.

Thus, the unusual sound (impactive sound) generated when the cover has been located at both the first position and second position can be suppressed.

Further, in accordance with the invention, when the cover is located at the first position, the other end of the helical spring is brought into contact with the first inner wall of the hole on the side apart from the cover. Therefore, when the cover is located at the first position, the urging means surely urges the cover toward the second position. When the cover is moved from the second position to the first position, as the cover approaches the first position, the cover is urged toward the second position by the urging means. For this reason, the impactive sound generated when the cover is moved from the second position to the first position and located at the first position can be suppressed.

When the cover is located at the second position, the other end of the helical spring is brought into contact with the second inner wall on the side near to the cover of the hole which passes through the rotary member. Therefore, when the cover is located at the second position, the urging means surely urges the cover toward the first position. When the cover is moved from the first position to the second position, as the cover approaches the second position, the cover is urged toward the first position by the urging means. For this reason, the impactive sound generated when the cover is moved from the first position to the second position and located at the second position can be suppressed.

Thus, the unusual sound (impactive sound) generated when the cover has been located at both the first position and second position can be suppressed.

Using a single helical spring, the first state where the cover is urged toward the second position by the urging means and the second state where the cover is urged toward the first position by the urging means can be changed from each other. Since the cover is urged toward both first position and second position, an increase in the number of components can be reduced. This suppresses the unusual sound and realizes the low production cost.

Incidentally, the contents of Japanese Patent Appln. No. 2002-109266 filed on Apr. 11, 2002 are hereby incorporated by reference.

What is claimed is:

1. An electronics instrument comprising: an instrument body and a cover which is attached on a surface of the instrument body so that the cover is movable between a first position and a second position wherein the surface of said instrument body is covered when the cover is in the first position and wherein at least a part of the surface of said instrument body is exposed when the cover is in the second position, and an urging device for urging said cover switchably between a first state in which the cover is urged toward the second position and a second state in which the cover is urged toward the first position, becoming said first state when said cover is located at the first position and becoming said second state when said cover is located at the second position.

2. An electronics instrument according to claim 1, further comprising:

an arm member for rotatably supporting said cover to said instrument body; and a rotary member which is rotated in both one direction and the other direction opposite thereto by driving force from a driving source, and rotated together with said arm member, wherein said urging device includes a helical spring with one end secured to said arm member and a central portion attached to a rotary center of said rotary member, and an arc hole through which said rotary member passes and into which the other end of said helical spring is to come, the center of said arc hole being positioned at the rotary center of said rotary member, and wherein when said cover is located at the first position, the other end of said helical spring is brought into contact with a first inner wall of said hole apart from said cover in the circumferential direction of said rotary member, and when said cover is located at the second position, the other end of said helical spring is brought into contact with a second inner wall of said hole near to said cover in the circumferential direction of said rotary member.

3. An electronics instrument according to claim 1, wherein said cover is located in an intermediate position which is between first position and said second position.

4. An electronics instrument according to claim 1, wherein a surface of said cover, which is exposed when said cover is in the first position, is oriented upward when said cover is in said second position.

5. An electronics instrument according to claim 1, wherein a surface of said cover, which is exposed when said cover is the first position, is parallel to the surface of said instrument body while in said first position.

6. An electronics instrument according to claim 1, wherein said surface comprises an insertion inlet, which is covered by said cover in said first position and wherein at least a part of said insertion inlet is exposed when said cover is in said second position.

7. An electronics instrument according to claim 2, wherein said cover is located between said first position and said second position, the other end of said helical spring is not in contact with said first inner wall and said second inner wall.

* * * * *